United States Patent [11] 3,604,401

| [72] | Inventors | John F. Cogger<br>Los Angeles;<br>Happy H. Unfried, Northridge, both of, Calif. |
|---|---|---|
| [21] | Appl. No. | 822,831 |
| [22] | Filed | Apr. 9, 1969 |
| [45] | Patented | Sept. 14, 1971 |
| [73] | Assignee | Kent H. Enderle<br>Seal Beach, Calif. |

[54] FUEL INJECTOR FOR INTERNAL COMBUSTION ENGINES
11 Claims, 8 Drawing Figs.

[52] U.S. Cl. .................................................. 123/32 JV,
123/119, 123/139.17
[51] Int. Cl. ......................................................F02m 63/02
[50] Field of Search........................................... 123/119,
139.17, 139.18, 140.3, 32 JV

[56] References Cited
UNITED STATES PATENTS

| 2,244,669 | 6/1941 | Becker.......................... | 123/140.3 |
| 2,706,976 | 4/1955 | Gianini.......................... | 123/119 |
| 2,863,433 | 12/1958 | Sarto............................. | 123/119 |
| 2,876,755 | 3/1959 | Gold et al. .................... | 123/119 |
| 3,386,709 | 6/1968 | Drayer.......................... | 123/119 X |

*Primary Examiner*—Laurence M. Goodridge
*Attorney*—Herzig & Walsh

ABSTRACT: The device is a fuel injector for internal combustion engines which matches fuel supplied to the engine's requirements over its operating range while maintaining an optimum fuel/air ratio in the supply to the engine. The fuel is supplied to a vortex valve or vortex generator which discharges a controlled conical spray of fluid into a manifold conduit leading to a cylinder. Opposite the spray is provided a pickup tube which picks up part of the sprayed fuel and returns it to the fuel tank. The pickup tube has orifices in its end, the shape of which is mathematically derived so as to match the quantity of fuel actually supplied to the cylinder to the cylinder's requirements over the operating range of the engine. The orifice shapes are derived from the characteristic curve of a positive displacement pump which delivers the fuel, that is, speed v. pressure, and the characteristic curve of the vortex valve or generator, that is, the pressure v. spray angle of the fuel sprayed through the discharge jet of the vortex valve. The engine speed and power are controlled by throttling the supply of air to the intake manifold. In a modified form of the invention the control jet of the vortex valve is regulated in response to exhaust temperature to maintain the fuel/air ratio.

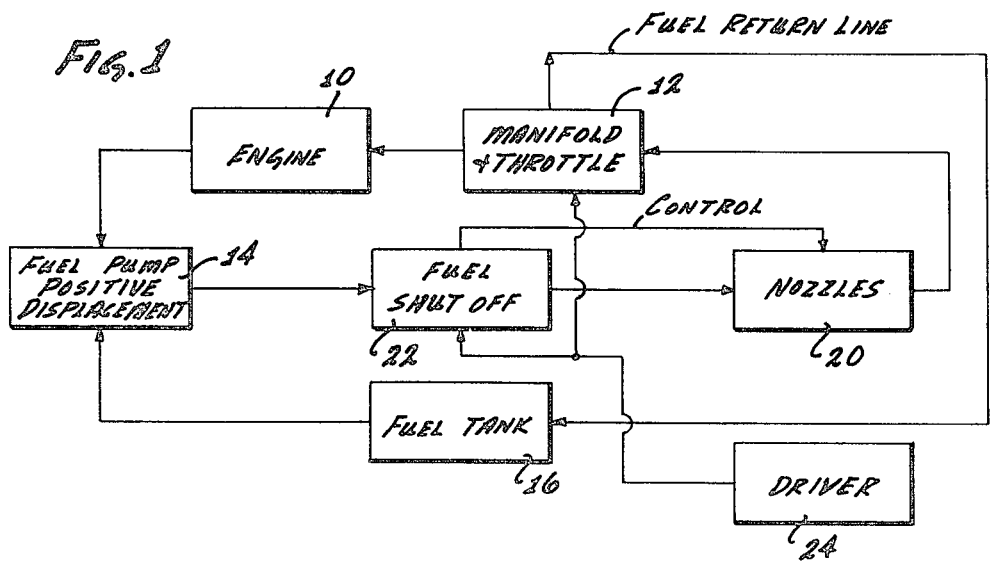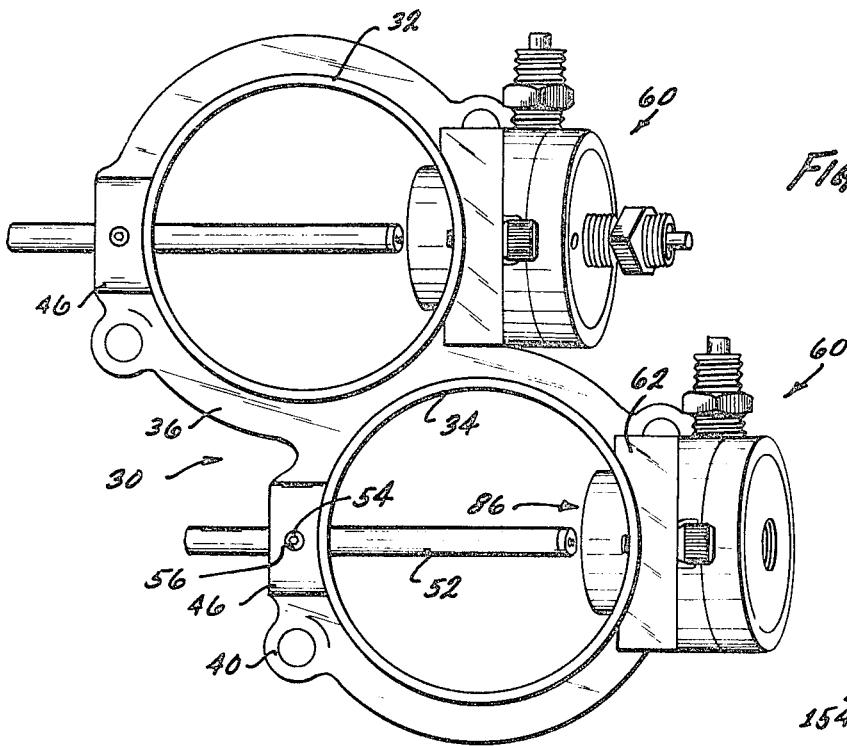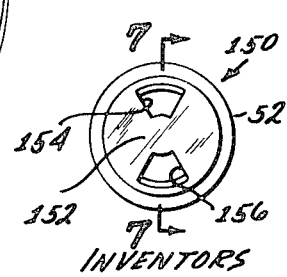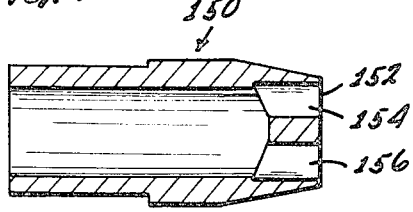

INVENTORS
JOHN F. COGGER
HAPPY H. UNFRIED

By Kenyon & Walsh
ATTORNEYS

FUEL INJECTOR FOR INTERNAL COMBUSTION ENGINES

SUMMARY OF THE INVENTION

The invention is an improved fuel injector for internal combustion engines and system of fuel control embodying the injector. The injector is capable of matching the supply of fuel to the engine requirements over the operating range of the engine. The system is one that maintains a proper fuel/air ratio over the operating range of the engine. The nature of the invention can be better understood from some elucidation of the background in the art and the problems involved.

BACKGROUND

It is, of course, a desired objective that a proper fuel/air ratio be provided at the point of combustion in the engine over its operating range. The most commonly known means of seeking to do this is the carburetor which is in effect an analogue-computer that measures the necessary variables and attempts to properly proportion the fuel with respect to the air to maintain a proper ratio over the range of speed of the engine. It is, of course, very difficult for a carburetor to do this because the variables involved have wide operating ranges, a very limited dynamic range unable to accommodate itself to the operating ranges of the variables. Furthermore, in designing a carburetor it is necessary that the designer know what the transfer function of the particular engine is over its operating range. This is a function that will change with time because of carbon deposits, scale, ring wear, etc., which change the conditions under which the engine mixes and burns the fuel. These considerations limit the efficiency of the carburetor and its ability to operate well over a wide range of loads and speeds, to say nothing of the aging of the engine.

Referring to fuel injectors which mix fuel with air outside the combustion chamber, they have the same general disadvantages as carburetors in that a great deal must be known about the engine to which the fuel injector is attached. Inasmuch as the engine ages, the injector system cannot be optimized because of variations as the engine ages. (The herein invention provides a technique and means for providing the proper fuel/air ratio for engines of the type under consideration which is independent of the particular design or age of the engine.).

It has been known to provide a device, particularly for light aircraft, which provides a proper fuel/air mixture by measuring exhaust temperature of the engine. The exhaust temperature is an excellent indicator of fuel/air ratio.

To meet the problem there was conceived a fuel injector having the capability of matching the fuel supply to the requirements of an engine over its full range of operation independently of variables that previously stood in the way of accomplishing this purpose. The nature of the invention will be understood from the following.

The injector nozzle itself has two very important functions. First, it must provide the proper amount of fuel for a given airflow, and secondly, it must break up this stream of liquid into tiny droplets which can mix with the air evenly so that the combustion process can take place. Conventional injector nozzles simply utilize a small hole with a high driving pressure. To get the necessary flow range more than one jet is used, as in carburetors, and they are switched in or out as needed. Carburetors require utilization of more than one jet to obtain the necessary flow range.

The system of the herein invention utilizes a single nozzle in such a way that it can be easily controlled, that is, a single nozzle for each cylinder, the nozzle having a fine atomization characteristic for any flow rate. Furthermore, the injector of the invention very readily can be made to have a flow curve, the slope of which can be varied independently of supply pressure, as well as described hereinafter.

To realize the characteristics referred to there was further conceived the combination of the use of vortex phenomena with the orifice of the injector, the vortex phenomena being one that is used in certain fluid amplifiers where the output cone angle from a jet orifice can be varied by changing the flow rate of a tangential jet into the device. In this matter the output jet can be changed from a solid stream to a cone with a half angle greater than 45°. This jet for a given lower pressure has a fixed flow rate which is in excess of that required by the engine. In accordance with the herein invention the fuel is supplied to the injector nozzle by a constant displacement pump directly driven by the engine so that the fuel pressure to the vortex generator will vary in proportion to engine speed.

A pickup tube is positioned spaced from the nozzle and this pickup tube has its end facing the conical spray, and it has specially shaped orifices in its end face which capture a part of the flow from the jet when the cone angle is less than about 45°. The holes are shaped such that the proper amount of fuel is captured for a given cone angle. The captured fuel is returned to the fuel tank. In this manner a high flow rate is maintained even at low engine speeds so that the atomization is good and the unwanted fuel is returned to the fuel tank. The shape of the orifices is derived from the characteristic curves of the fuel pump, that is, speed v. delivered pressure, and the characteristic curve of the vortex valve or generator, that is, discharge cone angle v. pressure. In this manner the fuel supply is matched to the engine requirements over its operating range independently of some of the many variables that mitigate against maintaining a proper fuel/air ratio using a carburetor. In the system of the invention the throttle of the engine controls only the air supply, the fuel supply being regulated in the manner described in the foregoing. Due to the characteristics of the vortex generator the fuel delivered in the conical spray at angles above about 45° varies with the speed of the engine in such relationship that the desired fuel/air ratio is substantially maintained by the vortex generator itself.

In the system as described a resistor, comprising a tube of small bore or diameter, provides a pressure differential between the supply of the vortex valve or generator and the jet control port that determines the cone angle. A shutoff type valve is controlled by the throttle and this valve is opened to short out or bypass the control resistance to limit flow of any fuel to the engine when the throttle is closed, as will be described more in detail hereinafter.

The characteristics of the fuel injector as described are such that it adapts itself ideally to control or regulation of the control jet in response to a condition indicative of air/fuel ratio such as exhaust temperature.

From the foregoing elucidation of the invention its objects will be clear to those skilled in the art. Briefly summarizing, they are to provide improved means for maintaining the proper optimum fuel/air ratio in the operation of internal combustion engines. A corollary object is to provide a device or system of this type which overcomes dependence on may variables which in other types of systems prevented adequately maintaining the proper fuel/air ratio.

A further object is to realize the purposes of the invention by way of a fuel injector wherein a pickup tube is utilized to return a part of fuel sprayed into an intake conduit to the fuel tank so that a relatively large flow can be maintained at all times, the pickup tube embodying orifices of mathematically derived shape and size whereby the supply of fuel is matched to the engine requirements independently of variables other than the characteristic curve of the positive displacement fuel pump and of the spray injector.

A further object is to realize effectiveness of the system by way of a vortex valve or generator capable of injecting a controlled conical spray of fuel into an air conduit, the said generator being controlled by way of a tangential fuel jet.

A further object resides in the provision of a method of operating an internal combustion engine wherein fuel is supplied to a fuel injector at pressure proportioned to engine speed; the fuel is spray injected into an air conduit; and a predetermined proportion of the sprayed fuel is returned to the tank whereby to match fuel supply to engine requirements while maintaining a proper fuel/air ratio.

Another object is to control the air/fuel ratio by regulating the control jet of the vortex valve in response to exhaust temperature.

Further objects and advantages of the invention will become apparent from the following detailed description and annexed drawings wherein:

FIG. 1 is block diagram of a fuel/air ratio control system for an internal combustion engine embodying the injector of the invention;

FIG. 2 is a view of one pair of fuel injectors adapted for supplying fuel to two cylinders of an engine;

Figure 3:
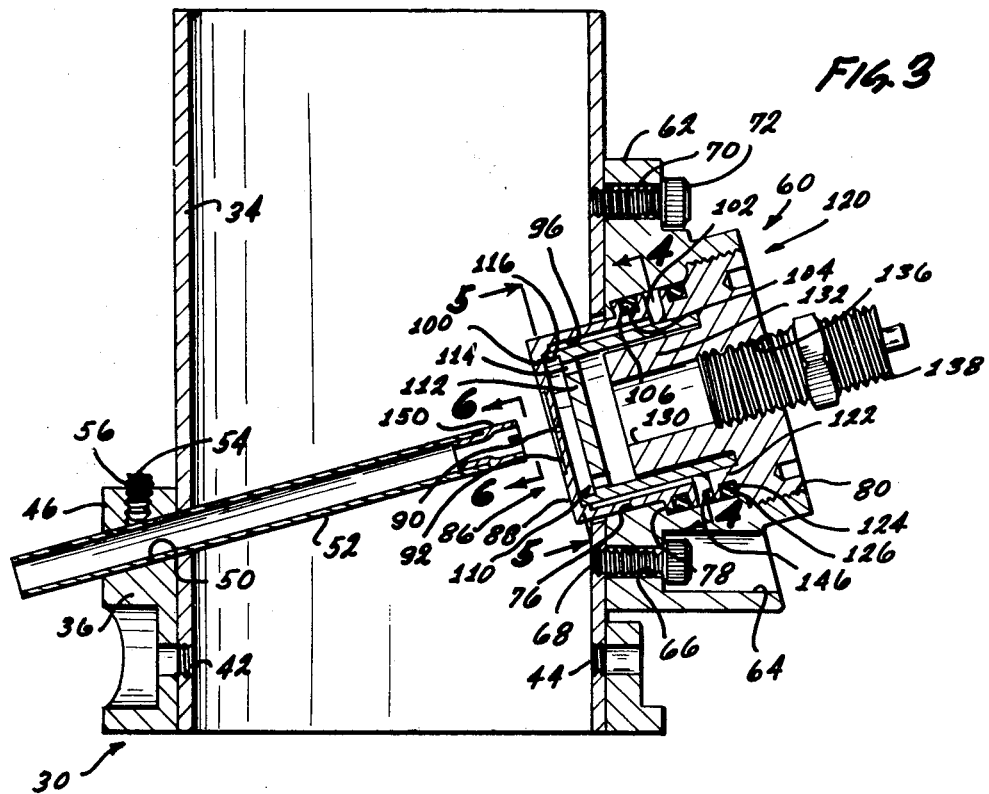
Figure 4:
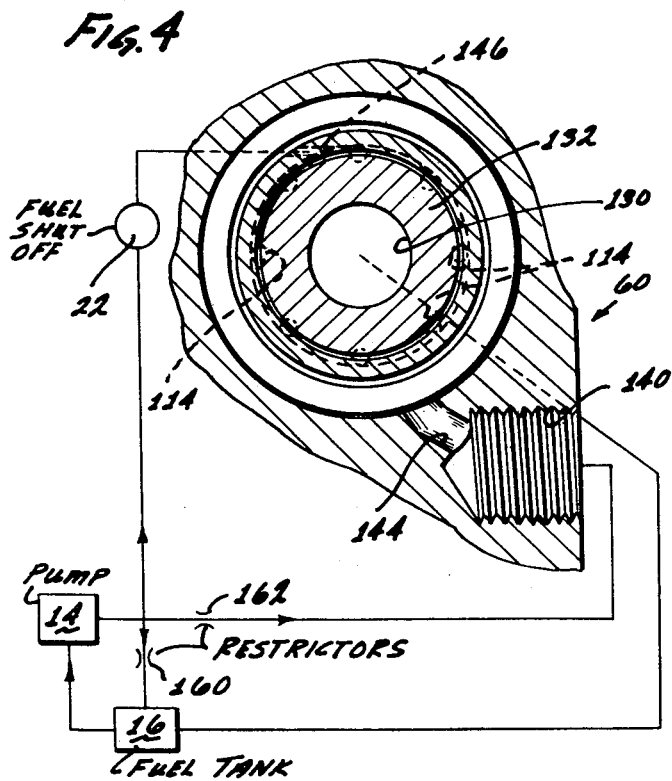
Figure 5:
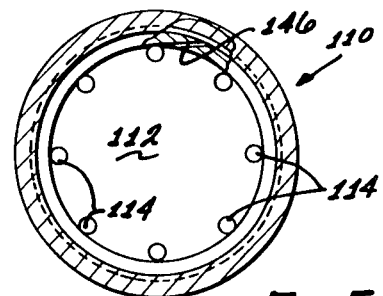

FIG,. 3 is a cross-sectional view through one of the fuel injectors of FIG. 2;

FIG. 4 is a sectional view taken along the line 4—4 of FIG. 3;

FIG. 5 is a sectional view taken along the line 5—5 of FIG. 3;

FIG. 6 is a view taken along the line 6—6 of FIG. 3;

FIG. 7 is a sectional view taken along the line 7—7 of FIG. 6.

Figure 8:
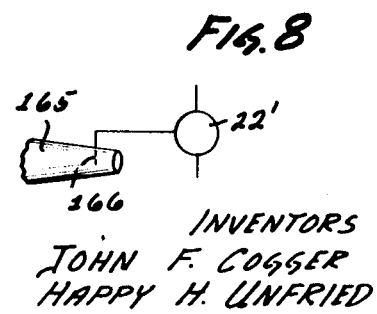

FIG. 8 is a diagrammatic view of a modified form or adaptation of the invention.

FIG. 1 illustrates the nature of the system in which the fuel injector is embodied. The engine 10 may be any of various types of internal combustion engines. The manifold 12 in the exemplary form of the invention described herein is of a type providing individual conduits leading to each cylinder of which there may be eight, for example. A separate fuel injector is provided for each cylinder, the injector being in the conduit that leads to its respective cylinder. The fuel is supplied by a positive displacement pump 14 that is driven by the engine so that its output pressure is proportional to engine speed. Fuel is supplied to the inlet side of the pump from the tank 16 and fuel that is picked up by the pickup tubes from the injectors, as will be described, is returned by way of the fuel return line to the fuel tank so that there is always a full volume flow being circulated by the pump. Numeral 20 designates the nozzles of the group of fuel injectors that are associated with the manifold. The fuel shutoff component 22 embodies a valve which shunts or bypasses the restriction that controls the jet of the vortex generator so that when no fuel is required as will be described, the vortex generator delivers a straight line concentrated jet whereby most all of the fuel is accepted by the pickup tubes and returned to the tank. The bypass valve is controlled by the driver by way of the accelerator pedal which is designated at 24 and this pedal also controls the inlet air to the manifold 12 so that the power delivered by the engine is controlled thereby.

In the preferred form of the invention as referred to above, the injectors are constructed in pairs as shown in FIG. 2. The two injectors shown are formed as part of a body which may be a casting and that is bolted on to the manifold so that the two injectors deliver fuel to two individual adjacent cylinders. The structure of FIG. 2 embodies a base carrying a pair of inlet pipes or conduits 32 and 34. FIG. 3 is a sectional view through the conduit 34. The body or base 30 has a cylindrical part 36 which receives the end of the pipe or conduit 34. The body 30 has extending lugs such as shown at 40 whereby it can be bolted to the manifold. The pipe 34 is secured to the body 30 in a suitable manner such as indicated at 42 and 44.

The body 30 has boss 46 at one side having an angular bore 50 through it and extending through this bore is the pickup tube 52 which extends into the interior of the pipe 34 as shown and which is held in position by a setscrew 54 in threaded bore 56.

One of the vortex valves or generators is designated generally by the numeral 60. It is built into a fitting 62 which may be a casting which is attached to the pipe 34. The body 62 has bore 64 extending normally to the axis of the pipe 34 and a counterbore 66 which receives a holding screw 68. The body 62 has another threaded bore 70 which receives another holding screw 72 whereby the body, that is, the injector, is secured to the pipe 34.

The body 60 has a bore 76; counterbore 78; and a further threaded counterbore 80. These bores are at an angle to the axis of the pipe 34 as shown, the axes of these bores being aligned with the axis of the pickup tube 52. Engaging in the counterbore 78 and the bore 76 is the cylindrical fitting member 86 having an end in the center of which is discharge orifice 90 which is opposite the end of the pickup tube 52. A depression 92 is formed in the end face of the end member 88 so that the material that the orifice 90 is in is of limited thickness.

The member 86 has a bore 96 and a short counterbore 100. At the inner end of the member 86 there is a flange member 102 in which is an annular groove 104 and received in this annular groove is the sealing O-ring 106 that seals in the bore 78 in the body 60. Numeral 110 designates a cylindrical member within the member 86. It has an end part 112 as may be seen in FIG. 5, around the periphery of which are a plurality of equally spaced apertures or openings 114 for a purpose that will be described presently. The body 110 is of less diameter than the bore 96 so that an annular space is provided between the body 110 and the interior of the body or member 86 as may be seen. At the end of the body 110 there is an extending flange 116 that is received or fits into the counterbore 100 in the member 86.

The threaded bore 80 receives an end closure plug 120 that has a part 122 of smaller diameter that is received in the bore 78, this part having an annular groove 124 that receives sealing O-ring 126. The end plug 120 has a bore 130. It has an inner part 132 of smaller diameter that fits inside of the body 110 leaving a narrow annular space therebetween and the inner end of the body 110, being received on the inside of the part 122 of end plug 120, that is, being received in the bore which is in the part 122. The outer part of the bore 130 is threaded as shown at 136 and this bore receives threaded nipple or fitting 138 to which connection can be made to a tube receiving fuel from the discharge of the fuel pump.

The fuel is delivered into the bore 130 through a restrictor and into the bore 109 of member 110, and it can then pass into or through the apertures 114 into the chamber between the end of member 110 and the end wall 88 of member 86. This is a cylindrical chamber which forms a vortex valve or generator. The member having the restrictor of small diameter may be internal or external with respect to the fuel injector.

Formed in the body 62 is threaded bore 140 the axis of which is transverse to the axis of the fuel injector. This bore communicates by way of a channel 144 with the annular space between the body 86 and the body 110. The bore 140 is also connected to the source of fuel, that is, the discharge from the positive displacement pump. Formed in a sidewall of the flange 116 is tangential channel or orifice 146 as may be seen in FIG. 5. Thus, fuel can be delivered from the annular space between the body or member 86 and the member 110 in a tangential direction into the vortex chamber between the end of the member 110 and the end 88 of member 86. This fuel being delivered through the channel 146 tangentially under pressure produces rotating vortexing action of the fuel entering the vortex chamber through the apertures 114. This is a symmetrical rotating vortex with the result that the fuel that is discharged through the axial orifice 90 is discharged in a conical spray of half angle determined by the pressure in the vortex generator and which half-angle is controllable.

FIG. 4 illustrates diagrammatically the restrictors 160 and 162 in the lines to the vortex valve and it shows the valve 22 controlled by the accelerator which causes most all the fuel to be returned to the tank. As previously pointed out, the axis of pickup tube 52 is aligned with the axis of the fuel injector 120, the end of the pickup tube being opposite to the discharge orifice 90. FIGS. 6 and 7 shows the end part of the pickup tube 52. Provided in the end of the pickup tube is a fitting 150 having an end part 152 in which are provided a pair of diametrically opposed orifices having a shape as shown at 154 and 156 in FIG. 6. The shapes of the openings 154 and 156 as shown are schematic. The precise shape of these openings is derived mathematically, the derivation being from the characteristic curve of the positive displacement pump, that is, the curve of speed v. pressure, and from the characteristic curve of the vortex generator, that is, the curve of delivered pressure v. half-angle of the conical spray. As a result of deriving the shapes of these openings in this manner, it is possible to provide for matching of the delivery of fuel to the actual requirements of the engine over its operating range. As pointed out above, the supply of air to the manifold is controlled by operation of the accelerator pedal and then as just described, the fuel injectors match the supply of fuel to the engine requirements. The fuel/air ratio may be controlled as described hereinafter in connection with FIG. 8 to eliminate dependency upon those variables which in the past made it difficult or impossible to maintain a proper fuel/air ratio. The apertures 154 and 156 pick up or entrain a part of the conical spray of fuel emerging from the orifice 90 and this part of it is returned to the fuel tank, and the part not picked up being entrained and mixed with the incoming air entering through the pipe 34. It may be observed that the fuel injector as described also has the characteristic that it is capable of breaking up a stream of incoming liquid fuel into tiny droplets which can mix with the air evenly so that the combustion process can take place efficiently. Only a single-injector nozzle is required for each cylinder. The injector provides for a fine atomization of fuel at any flow rate. The apertures 154 and 156 serve to capture a proper amount of fuel for the lower cone angles which fuel is returned to the fuel tank. In this manner a high flow rate is maintained even at low engine speeds so that atomization is good, and at higher engine speeds, when the cone angle is great enough to miss the apertures 154 and 156, the variation in flow rate of fuel due to the characteristics of the vortex generator maintains substantially the proper fuel to air ratio.

FIG. 4 illustrates preferred connections between the vortex valve, the pump and the fuel tank. Ordinarily the pump will be of greater capacity than required to supply fuel at the needed rate. It draws fuel from the tank 16 and pumps it into the lines as shown having branches to the fuel shutoff valve and control jet and the vortex valve and a bypass through the restrictor 160 to the fuel tank. The bypass takes care of any excess of discharge of fuel over that needed to meet requirements of the engine.

The system as so far described is one that adapts itself ideally to control of the fuel/air ratio in response to a controlling condition such as for example exhaust temperature of the engine. Such a modification or adaptation is shown in FIG. 8. Numeral 165 designates diagrammatically the engine exhaust. An exhaust temperature sensor designated at 166 is positioned in the exhaust and it controls a valve 22' and this may be through a suitable interface instrumentality if appropriate. The valve 22' corresponds to the valve 22 but it is now adjusted in accordance with the exhaust temperature which as previously indicated is an accurate measure of the fuel/air ratio so that by adjusting valve 22' in this manner, then the fuel/air ratio is appropriately controlled by controlling the fuel supply. The valve 22' may be one that is at the same time controlled by the accelerator pedal as is the valve 22.

The following describes a typical preferred technique for deriving the shape of the openings 154 and 156 in a particular injector vortex valve. The flow rate required for a particular engine can, of course, be determined in terms of flow in grams per second and plotted. The total flow through the vortex valve can similarly be plotted. The spray cone angle is known, as well as the diameter and spacing of the pickup tube. The flow represented by the area between the two curves as thus plotted is the amount of flow that is desired be returned to the fuel tank by way of the pickup tube. The total flow through the vortex valve does not vary with pressure in quite the same way as does the flow that it is desired be returned to the tank so it necessarily follows that an odd-shaped hole is required in the end of the pickup tube. A plot is then made of the ratio of the total flow through the valve to the flow required by the engine, the area under this curve representing the flow that is to be returned to the fuel tank. To find the shape of the holes in the pickup tube this ratio is multiplied by 180° rather than 360° since two symmetrical holes are desired; the resulting plot provides the desired shapes of the holes. The ratio referred to gives the resultant width of the hole at the particular diameter and thus it can be seen that by determining the ratio referred to for any pair of curves representing the required flow and the actual flow by the technique described it is possible to determine the proper shape of the pickup tube holes.

From the foregoing those skilled in the art will readily understand the nature of the construction and operation of the invention and the manner in which it achieves and realizes the objects and advantages as set forth in the foregoing as well as the many additional advantages that are apparent from the detailed description.

The foregoing disclosure representative of preferred forms of the invention and is to be interpreted in an illustrative rather than a limiting sense, the invention to be accorded the full scope of the claims appended hereto.

We claim:

1. For use in internal combustion engines which use liquid fuel, a fuel injector comprising means for discharging a spray of fuel of uniform conical shape having a variable half-angle, dependent upon the speed of said engine, means having a pickup orifice positioned to receive a part of said spray depending on said half-angle, and to return it to a source of fuel, the said discharge means being positioned so that the remaining part of the fuel is combined with air and then delivered to an engine cylinder.

2. A fuel injector as in claim 1 wherein the said orifice is configurated whereby the amount of fuel mixed with air and delivered to a cylinder is proportioned to the fuel/air requirements of the cylinder over the operating range of the engine.

3. A fuel injector as in claim 1 including means for delivering fuel to the discharge means at a rate proportional to engine speed.

4. A fuel injector as in claim 1 wherein said pickup means comprises a pickup tube having an axis positioned parallel with the axis of the fuel discharge.

5. A fuel injector as in claim 4 wherein the axis of the pickup tube is aligned with an orifice through which fuel is discharged.

6. A fuel injector as in claim 1 wherein said fuel discharge means comprises a vortex generator including a discharge orifice positioned to cause a uniform conical spray discharge.

7. A fuel injector as in claim 6 wherein the said vortex generator comprises means forming a cylindrical chamber having opening means to receive incoming fuel, means comprising a control jet to inject fuel tangentially to said cylindrical chamber for generating a vortex therein, said discharge orifice being aligned with the axis of the cylindrical chamber so as to discharge in a direction normal to the vortex.

8. A method of operating an internal combustion engine whereby to supply fuel at a rate matching engine requirements in a proper fuel/air ratio over the operating range of the engine comprising injecting fuel in a uniform conical spray pattern of variable half-angle, depending upon the speed of said engine, into an air conduit leading to the engine, and collecting a predetermined part of the sprayed fuel depending on said half-angle and returning it to a source of fuel.

9. A method as in claim 8 including the step of supplying fuel to be injected by way of a pump driven by the engine whereby the supply pressure is proportioned to engine speed.

10. A method as in claim 8 including the step of establishing the spray pattern by the discharge pressure of the discharged fuel and the characteristics of the injector which discharges the spray.

11. A method as in claim 8 including controlling the power output of the engine by controlling the supply of air to it.